(12) United States Patent
Bolton et al.

(10) Patent No.: US 7,949,810 B2
(45) Date of Patent: May 24, 2011

(54) TECHNIQUES FOR TRANSFERRING DATA BETWEEN A MEDIA PLAYER AND AN ACCESSORY HAVING A TUNER

(75) Inventors: Lawrence G. Bolton, Fremont, CA (US); Gregory T. Lydon, Santa Cruz, CA (US); Terry Tikalsky, Sunnyvale, CA (US); Donald J. Novotney, San Jose, CA (US); John B. Filson, San Jose, CA (US); David Tupman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/208,987

(22) Filed: Sep. 11, 2008

(65) Prior Publication Data

US 2009/0125134 A1 May 14, 2009

Related U.S. Application Data

(63) Continuation of application No. 11/519,386, filed on Sep. 11, 2006, now Pat. No. 7,441,058.

(51) Int. Cl.
*G06F 13/42* (2006.01)
(52) U.S. Cl. ............ 710/105; 710/300; 710/64; 710/72; 710/63
(58) Field of Classification Search .......... 710/300–306, 710/104–106, 8–12, 36–38, 62–64, 72
See application file for complete search history.

(56) References Cited

U.S. PATENT DOCUMENTS

| | | | |
|---|---|---|---|
| 4,673,861 A | 6/1987 | Dubovsky et al. |
| 4,850,899 A | 7/1989 | Maynard |
| 4,916,334 A | 4/1990 | Minagawa et al. |
| 4,924,216 A | 5/1990 | Leung |
| 4,938,483 A | 7/1990 | Yavetz |
| 5,041,025 A | 8/1991 | Haitmanek |
| 5,051,606 A | 9/1991 | Ikehara |
| 5,055,069 A | 10/1991 | Townsend et al. |
| 5,080,603 A | 1/1992 | Mouissie |
| 5,104,243 A | 4/1992 | Harding |

(Continued)

FOREIGN PATENT DOCUMENTS

EP 1049278 A1 11/2000

(Continued)

OTHER PUBLICATIONS

MAXTech Technology Ltd., CES 2000/Las Vegas, Jan. 6-9, 2000, [on line], [retrieved on Sep. 26, 2008]. Retrieved from the Internet <URL: http://web.archive.org/web/20000930170634/www.maxtech.com.hk/t-details.htm>. 2 pages.

(Continued)

*Primary Examiner* — Raymond N Phan
(74) *Attorney, Agent, or Firm* — Kilpatrick Townsend & Stockton LLP

(57) ABSTRACT

A method, system, and connector interface for controlling an accessory. The method includes obtaining, by a portable media player, tuning information from the accessory; and controlling, by the portable media player, the accessory based on the tuning information. According to the system and method disclosed herein, the portable media player and accessory may utilize a plurality of commands utilized in a variety of environments such as within a connector interface system environment to control access to the portable media player.

43 Claims, 9 Drawing Sheets

U.S. PATENT DOCUMENTS

| | | | |
|---|---|---|---|
| 5,108,313 A | 4/1992 | Adams | |
| 5,150,031 A | 9/1992 | James et al. | |
| 5,186,646 A | 2/1993 | Pederson | |
| 5,247,138 A | 9/1993 | Landmeier | |
| 5,277,624 A | 1/1994 | Champion | |
| 5,303,393 A | 4/1994 | Noreen et al. | |
| 5,471,128 A | 11/1995 | Patino et al. | |
| 5,525,981 A | 6/1996 | Abernethy | |
| 5,586,893 A | 12/1996 | Mosquera | |
| 5,592,588 A | 1/1997 | Reekes et al. | |
| 5,618,045 A | 4/1997 | Kagan et al. | |
| 5,648,712 A | 7/1997 | Hahn | |
| 5,660,558 A | 8/1997 | Osanai et al. | |
| 5,675,467 A | 10/1997 | Nishimura et al. | |
| 5,727,866 A | 3/1998 | Kraines et al. | |
| 5,732,361 A | 3/1998 | Liu | |
| 5,754,027 A | 5/1998 | Oglesbee et al. | |
| 5,794,127 A | 8/1998 | Lansang | |
| 5,830,001 A | 11/1998 | Kinoshita | |
| 5,835,862 A | 11/1998 | Nykanen et al. | |
| 5,845,217 A | 12/1998 | Lindell et al. | |
| 5,859,522 A | 1/1999 | Theobald | |
| 5,901,049 A | 5/1999 | Schmidt et al. | |
| 5,964,847 A | 10/1999 | Booth et al. | |
| 5,975,957 A | 11/1999 | Noda et al. | |
| 6,007,372 A | 12/1999 | Wood | |
| 6,012,105 A | 1/2000 | Rubbmark et al. | |
| 6,031,797 A | 2/2000 | Van Ryzint et al. | |
| 6,053,773 A | 4/2000 | Wu | |
| 6,078,402 A | 6/2000 | Fischer et al. | |
| 6,078,789 A | 6/2000 | Bodenmann et al. | |
| 6,125,455 A | 9/2000 | Yeo | |
| 6,130,518 A | 10/2000 | Gabehart et al. | |
| 6,139,373 A | 10/2000 | Ward et al. | |
| 6,154,773 A | 11/2000 | Roberts et al. | |
| 6,154,798 A | 11/2000 | Lin et al. | |
| 6,161,027 A | 12/2000 | Poirel | |
| 6,169,387 B1 | 1/2001 | Kaib | |
| 6,175,358 B1 | 1/2001 | Scott-Jackson et al. | |
| 6,178,514 B1 | 1/2001 | Wood | |
| 6,184,652 B1 | 2/2001 | Yang | |
| 6,184,655 B1 | 2/2001 | Malackowski | |
| 6,188,265 B1 | 2/2001 | Liu et al. | |
| 6,203,345 B1 | 3/2001 | Roque et al. | |
| 6,204,637 B1 | 3/2001 | Rengan | |
| 6,206,480 B1 | 3/2001 | Thompson | |
| 6,211,581 B1 | 4/2001 | Farrant | |
| 6,211,649 B1 | 4/2001 | Matsuda | |
| 6,224,420 B1 | 5/2001 | Nishio et al. | |
| 6,230,205 B1 | 5/2001 | Garrity et al. | |
| 6,234,827 B1 | 5/2001 | Nishio et al. | |
| 6,236,395 B1 | 5/2001 | Sezan et al. | |
| 6,252,380 B1 | 6/2001 | Koenck | |
| 6,261,109 B1 | 7/2001 | Liu et al. | |
| 6,262,723 B1 | 7/2001 | Matsuzawa et al. | |
| 6,267,623 B1 | 7/2001 | Hisamatsu | |
| 6,268,845 B1 | 7/2001 | Pariza et al. | |
| 6,271,605 B1 | 8/2001 | Carkner et al. | |
| 6,272,328 B1 * | 8/2001 | Nguyen et al. | 455/277.1 |
| 6,280,251 B1 | 8/2001 | Nishio et al. | |
| 6,283,789 B1 | 9/2001 | Tsai | |
| 6,304,764 B1 | 10/2001 | Pan | |
| 6,314,479 B1 | 11/2001 | Frederick et al. | |
| 6,316,916 B2 | 11/2001 | Bohne | |
| 6,319,061 B1 | 11/2001 | Chen et al. | |
| 6,322,396 B1 | 11/2001 | Kuan | |
| 6,344,727 B1 | 2/2002 | Desai et al. | |
| 6,353,894 B1 | 3/2002 | Pione | |
| 6,354,713 B1 | 3/2002 | Leifer et al. | |
| 6,358,089 B1 | 3/2002 | Kuroda et al. | |
| 6,372,974 B1 | 4/2002 | Gross et al. | |
| 6,385,596 B1 | 5/2002 | Wiser et al. | |
| 6,394,905 B1 | 5/2002 | Takeda et al. | |
| 6,429,879 B1 | 8/2002 | Sturgeon et al. | |
| 6,431,915 B1 | 8/2002 | Ko | |
| 6,453,371 B1 | 9/2002 | Hampson et al. | |
| 6,454,592 B2 | 9/2002 | Takagi | |
| 6,461,173 B1 | 10/2002 | Mizuno et al. | |
| 6,464,542 B1 | 10/2002 | Lee | |
| 6,468,110 B2 | 10/2002 | Fujino et al. | |
| 6,476,825 B1 | 11/2002 | Croy et al. | |
| 6,478,603 B1 | 11/2002 | Wu | |
| 6,483,428 B1 | 11/2002 | Fish et al. | |
| 6,485,328 B1 | 11/2002 | Wu | |
| 6,489,751 B2 | 12/2002 | Small et al. | |
| 6,501,441 B1 | 12/2002 | Ludtke et al. | |
| 6,505,160 B1 | 1/2003 | Levy et al. | |
| 6,524,119 B2 | 2/2003 | Kato et al. | |
| 6,526,287 B1 | 2/2003 | Lee | |
| 6,558,201 B1 | 5/2003 | Begley et al. | |
| 6,577,877 B1 | 6/2003 | Charlier et al. | |
| 6,589,076 B1 | 7/2003 | Davis et al. | |
| 6,591,085 B1 | 7/2003 | Grady | |
| 6,608,264 B1 | 8/2003 | Fouladpour | |
| 6,608,399 B2 | 8/2003 | McConnell et al. | |
| 6,614,232 B1 | 9/2003 | Mukai | |
| 6,616,473 B2 | 9/2003 | Kamata et al. | |
| 6,629,197 B1 | 9/2003 | Bhogal et al. | |
| 6,642,629 B2 | 11/2003 | DeLeeuw | |
| 6,651,138 B2 | 11/2003 | Lai et al. | |
| 6,653,813 B2 | 11/2003 | Khatri | |
| 6,663,420 B1 | 12/2003 | Xiao | |
| 6,665,803 B2 | 12/2003 | Lunsford et al. | |
| 6,670,997 B1 | 12/2003 | Nortrup | |
| 6,674,995 B1 | 1/2004 | Meyers et al. | |
| 6,687,454 B1 | 2/2004 | Kuroiwa | |
| 6,697,944 B1 | 2/2004 | Jones et al. | |
| 6,708,283 B1 | 3/2004 | Nelvin et al. | |
| 6,724,339 B2 | 4/2004 | Conway et al. | |
| 6,725,061 B1 | 4/2004 | Hutchison, IV et al. | |
| 6,728,546 B1 | 4/2004 | Peterson et al. | |
| 6,728,729 B1 | 4/2004 | Jawa et al. | |
| 6,747,859 B2 | 6/2004 | Walbeck et al. | |
| 6,754,468 B1 | 6/2004 | Sieben et al. | |
| 6,761,635 B2 | 7/2004 | Hoshino et al. | |
| 6,774,939 B1 | 8/2004 | Peng | |
| 6,776,626 B2 | 8/2004 | Huang et al. | |
| 6,776,660 B1 | 8/2004 | Kubota et al. | |
| 6,776,665 B2 | 8/2004 | Huang | |
| 6,799,226 B1 | 9/2004 | Robbin et al. | |
| 6,801,964 B1 | 10/2004 | Mahdavi | |
| 6,813,528 B1 | 11/2004 | Yang | |
| 6,816,376 B2 | 11/2004 | Bright et al. | |
| 6,830,160 B2 | 12/2004 | Risolia | |
| 6,859,538 B1 | 2/2005 | Voltz | |
| 6,859,854 B2 | 2/2005 | Kwong | |
| 6,879,843 B1 | 4/2005 | Kim | |
| 6,928,295 B2 | 8/2005 | Olson et al. | |
| 6,931,266 B2 | 8/2005 | Miyoshi et al. | |
| 6,931,456 B2 | 8/2005 | Payne et al. | |
| 6,939,177 B2 | 9/2005 | Kato et al. | |
| 6,944,704 B2 | 9/2005 | Brelin | |
| 6,991,483 B1 | 1/2006 | Milan et al. | |
| 7,004,787 B2 | 2/2006 | Milan | |
| 7,013,164 B2 * | 3/2006 | Lin | 455/557 |
| 7,040,919 B2 | 5/2006 | Yao | |
| 7,050,783 B2 | 5/2006 | Curtiss et al. | |
| 7,054,888 B2 | 5/2006 | La Chapelle et al. | |
| 7,062,261 B2 | 6/2006 | Goldstein et al. | |
| 7,108,560 B1 | 9/2006 | Chou et al. | |
| 7,127,678 B2 | 10/2006 | Bhesania et al. | |
| 7,127,879 B2 | 10/2006 | Zhu et al. | |
| 7,155,545 B1 | 12/2006 | Wang | |
| 7,167,112 B2 | 1/2007 | Andersen et al. | |
| 7,167,935 B2 | 1/2007 | Hellberg | |
| 7,187,947 B1 | 3/2007 | White et al. | |
| 7,187,948 B2 | 3/2007 | Alden | |
| 7,215,042 B2 | 5/2007 | Yan | |
| 7,281,214 B2 | 10/2007 | Fadell | |
| 7,293,122 B1 | 11/2007 | Schubert et al. | |
| 7,293,227 B2 | 11/2007 | Plastina et al. | |
| 7,299,304 B2 | 11/2007 | Saint-Hilaire et al. | |
| 7,303,282 B2 | 12/2007 | Dwyer et al. | |
| 7,304,685 B2 | 12/2007 | Park et al. | |
| 7,305,254 B2 | 12/2007 | Findikli | |
| 7,305,506 B1 | 12/2007 | Lydon et al. | |
| 7,362,963 B2 | 4/2008 | Lin | |

| Patent/Pub No. | Date | Inventor |
|---|---|---|
| 7,415,563 B1 | 8/2008 | Holden et al. |
| 7,441,058 B1 | 10/2008 | Bolton et al. |
| 7,441,062 B2 | 10/2008 | Novotney et al. |
| 7,444,388 B1 | 10/2008 | Svendsen |
| 7,454,019 B2 | 11/2008 | Williams |
| 7,526,588 B1 | 4/2009 | Schubert et al. |
| 7,529,870 B1 | 5/2009 | Schubert et al. |
| 7,529,871 B1 | 5/2009 | Schubert et al. |
| 7,529,872 B1 | 5/2009 | Schubert et al. |
| 7,558,894 B1 | 7/2009 | Lydon et al. |
| 7,587,540 B2 | 9/2009 | Novotney et al. |
| 7,590,783 B2 | 9/2009 | Lydon et al. |
| 7,610,350 B2 | 10/2009 | Abdulrahiman et al. |
| 7,634,605 B2 | 12/2009 | Laefer et al. |
| 7,660,929 B2 | 2/2010 | Novotney et al. |
| 7,673,083 B2 | 3/2010 | Laefer et al. |
| 7,757,026 B2 | 7/2010 | Novotney et al. |
| 7,779,185 B2 | 8/2010 | Schubert et al. |
| 7,797,471 B2 | 9/2010 | Laefer et al. |
| 2001/0003205 A1 | 6/2001 | Gilbert |
| 2001/0005641 A1 | 6/2001 | Matsumoto et al. |
| 2001/0006884 A1 | 7/2001 | Matsumoto |
| 2002/0002035 A1 | 1/2002 | Sim et al. |
| 2002/0010759 A1 | 1/2002 | Hitson et al. |
| 2002/0025042 A1 | 2/2002 | Saito |
| 2002/0029303 A1 | 3/2002 | Nguyen |
| 2002/0065074 A1 | 5/2002 | Cohn et al. |
| 2002/0068610 A1 | 6/2002 | Anvekar et al. |
| 2002/0072390 A1 | 6/2002 | Uchiyama |
| 2002/0103008 A1 | 8/2002 | Rahn et al. |
| 2002/0105861 A1 | 8/2002 | Leapman |
| 2002/0108108 A1 | 8/2002 | Akaiwa et al. |
| 2002/0115480 A1 | 8/2002 | Huang |
| 2002/0116533 A1 | 8/2002 | Holliman et al. |
| 2002/0132575 A1 | 9/2002 | Kesling et al. |
| 2002/0132651 A1 | 9/2002 | Jinnouchi |
| 2002/0151327 A1 | 10/2002 | Levitt |
| 2002/0152874 A1 | 10/2002 | Vilcauskas et al. |
| 2002/0156546 A1 | 10/2002 | Ramaswamy |
| 2002/0156949 A1 | 10/2002 | Kubo et al. |
| 2002/0173273 A1 | 11/2002 | Spurgat et al. |
| 2002/0174269 A1 | 11/2002 | Spurgat et al. |
| 2002/0183059 A1 | 12/2002 | Noreen et al. |
| 2002/0194621 A1 | 12/2002 | Tran et al. |
| 2003/0004934 A1 | 1/2003 | Qian |
| 2003/0011608 A1 | 1/2003 | Wada |
| 2003/0028664 A1 | 2/2003 | Tan et al. |
| 2003/0040272 A1 | 2/2003 | Lelievre et al. |
| 2003/0041206 A1 | 2/2003 | Dickie |
| 2003/0059022 A1 | 3/2003 | Nebiker et al. |
| 2003/0067741 A1 | 4/2003 | Alfonso et al. |
| 2003/0073432 A1 | 4/2003 | Meade |
| 2003/0079038 A1 | 4/2003 | Robbin et al. |
| 2003/0090988 A1 | 5/2003 | Chen et al. |
| 2003/0097379 A1 | 5/2003 | Ireton |
| 2003/0110403 A1 | 6/2003 | Crutchfield et al. |
| 2003/0151621 A1 | 8/2003 | McEvilly et al. |
| 2003/0167318 A1 | 9/2003 | Robbin et al. |
| 2003/0172209 A1 | 9/2003 | Liu et al. |
| 2003/0185395 A1 | 10/2003 | Lee et al. |
| 2003/0198015 A1 | 10/2003 | Vogt |
| 2003/0220988 A1 | 11/2003 | Hymel |
| 2003/0236075 A1 | 12/2003 | Johnson et al. |
| 2003/0237043 A1 | 12/2003 | Novak et al. |
| 2004/0003300 A1 | 1/2004 | Malueg et al. |
| 2004/0019497 A1 | 1/2004 | Volk et al. |
| 2004/0039860 A1 | 2/2004 | Mills et al. |
| 2004/0048569 A1 | 3/2004 | Kawamura |
| 2004/0090998 A1 | 5/2004 | Chen |
| 2004/0103223 A1 | 5/2004 | Gabehart et al. |
| 2004/0116005 A1 | 6/2004 | Choi |
| 2004/0117855 A1 | 6/2004 | Nakamura |
| 2004/0127199 A1 | 7/2004 | Kagan et al. |
| 2004/0162029 A1 | 8/2004 | Grady |
| 2004/0164708 A1 | 8/2004 | Veselic et al. |
| 2004/0172533 A1 | 9/2004 | DeMello et al. |
| 2004/0186935 A1 | 9/2004 | Bel et al. |
| 2004/0194154 A1 | 9/2004 | Meadors et al. |
| 2004/0198436 A1 | 10/2004 | Alden |
| 2004/0224638 A1 | 11/2004 | Fadell et al. |
| 2004/0235339 A1 | 11/2004 | Sato et al. |
| 2004/0249994 A1 | 12/2004 | Shapiro et al. |
| 2004/0252966 A1 | 12/2004 | Holloway et al. |
| 2004/0267812 A1 | 12/2004 | Harris et al. |
| 2004/0267825 A1 | 12/2004 | Novak et al. |
| 2004/0268397 A1 | 12/2004 | Dunbar et al. |
| 2005/0014119 A1 | 1/2005 | Rudakov |
| 2005/0014531 A1 | 1/2005 | Findikli |
| 2005/0014536 A1 | 1/2005 | Grady |
| 2005/0014538 A1 | 1/2005 | Hyun et al. |
| 2005/0015355 A1 | 1/2005 | Heller et al. |
| 2005/0018768 A1 | 1/2005 | Mabey et al. |
| 2005/0020223 A1 | 1/2005 | Ellis et al. |
| 2005/0022212 A1 | 1/2005 | Bowen |
| 2005/0047071 A1* | 3/2005 | Tse Chun Hin ............... 361/683 |
| 2005/0135790 A1 | 6/2005 | Matthijs |
| 2005/0149213 A1 | 7/2005 | Guzak et al. |
| 2005/0181756 A1 | 8/2005 | Lin |
| 2005/0198189 A1 | 9/2005 | Robinson et al. |
| 2005/0207726 A1 | 9/2005 | Chen |
| 2005/0227612 A1* | 10/2005 | Helstrom et al. ............ 455/3.02 |
| 2005/0239333 A1 | 10/2005 | Watanabe et al. |
| 2005/0240705 A1 | 10/2005 | Novotney et al. |
| 2005/0246375 A1 | 11/2005 | Manders et al. |
| 2005/0281185 A1 | 12/2005 | Kawasaki |
| 2006/0015826 A1 | 1/2006 | Shiozawa et al. |
| 2006/0031545 A1 | 2/2006 | Manders et al. |
| 2006/0056796 A1 | 3/2006 | Nishizawa |
| 2006/0088228 A1 | 4/2006 | Marriott et al. |
| 2006/0116009 A1 | 6/2006 | Langberg et al. |
| 2006/0143680 A1 | 6/2006 | Adachi |
| 2006/0156415 A1 | 7/2006 | Rubinstein et al. |
| 2006/0161621 A1 | 7/2006 | Rosenberg |
| 2006/0163358 A1 | 7/2006 | Biderman |
| 2006/0168298 A1 | 7/2006 | Aoki et al. |
| 2006/0184456 A1 | 8/2006 | de Janasz |
| 2006/0184960 A1 | 8/2006 | Horton et al. |
| 2006/0188237 A1 | 8/2006 | Watanabe et al. |
| 2006/0224620 A1 | 10/2006 | Silverman et al. |
| 2006/0235864 A1 | 10/2006 | Hotelling et al. |
| 2006/0236245 A1 | 10/2006 | Agarwal et al. |
| 2006/0247851 A1 | 11/2006 | Morris |
| 2006/0258289 A1 | 11/2006 | Dua |
| 2006/0294209 A1 | 12/2006 | Rosenbloom et al. |
| 2007/0018947 A1 | 1/2007 | Toro-Lira |
| 2007/0056012 A1 | 3/2007 | Kwon et al. |
| 2007/0056013 A1 | 3/2007 | Duncan |
| 2007/0070856 A1 | 3/2007 | Tebele |
| 2007/0080823 A1 | 4/2007 | Fu et al. |
| 2007/0083750 A1 | 4/2007 | Miura et al. |
| 2007/0083814 A1 | 4/2007 | Wilbrink et al. |
| 2007/0086724 A1 | 4/2007 | Grady et al. |
| 2007/0106760 A1 | 5/2007 | Houh et al. |
| 2007/0130592 A1 | 6/2007 | Haeusel |
| 2007/0173197 A1 | 7/2007 | Hsiung |
| 2007/0173294 A1 | 7/2007 | Hsiung |
| 2007/0206827 A1 | 9/2007 | Tupman et al. |
| 2007/0226238 A1 | 9/2007 | Kiilerich et al. |
| 2007/0226384 A1 | 9/2007 | Robbin et al. |
| 2007/0233294 A1 | 10/2007 | Holden et al. |
| 2007/0233295 A1 | 10/2007 | Laefer et al. |
| 2007/0234420 A1 | 10/2007 | Novotney et al. |
| 2007/0236482 A1 | 10/2007 | Proctor et al. |
| 2007/0247794 A1 | 10/2007 | Jaffe et al. |
| 2007/0300155 A1 | 12/2007 | Laefer et al. |
| 2008/0025172 A1 | 1/2008 | Holden et al. |
| 2008/0034325 A1 | 2/2008 | Ording |
| 2008/0055272 A1 | 3/2008 | Anzures et al. |
| 2008/0065722 A1 | 3/2008 | Brodersen et al. |
| 2008/0125031 A1 | 5/2008 | Fadell et al. |
| 2008/0188209 A1 | 8/2008 | Dorogusker et al. |
| 2008/0298440 A1 | 12/2008 | Kroeger et al. |
| 2009/0013096 A1 | 1/2009 | Novotney et al. |
| 2009/0013110 A1 | 1/2009 | Novotney et al. |
| 2009/0013253 A1 | 1/2009 | Laefer et al. |
| 2009/0125134 A1 | 5/2009 | Bolton et al. |
| 2009/0132076 A1 | 5/2009 | Holden et al. |
| 2009/0198361 A1 | 8/2009 | Schubert et al. |

| | | | |
|---|---|---|---|
| 2009/0204244 | A1 | 8/2009 | Schubert et al. |
| 2009/0204738 | A1 | 8/2009 | Schubert et al. |
| 2009/0210079 | A1 | 8/2009 | Schubert et al. |
| 2009/0249101 | A1 | 10/2009 | Lydon et al. |
| 2009/0292835 | A1 | 11/2009 | Novotney et al. |
| 2009/0299506 | A1 | 12/2009 | Lydon et al. |
| 2010/0106879 | A1 | 4/2010 | Laefer et al. |

FOREIGN PATENT DOCUMENTS

| | | |
|---|---|---|
| EP | 1104150 | 5/2001 |
| EP | 1150472 A2 | 10/2001 |
| EP | 1367734 A1 | 12/2003 |
| EP | 1498899 A | 1/2005 |
| EP | 1594319 A | 11/2005 |
| EP | 1650971 A1 | 4/2006 |
| EP | 1672613 A | 6/2006 |
| EP | 1942393 A1 | 1/2007 |
| EP | 1942393 A1 | 7/2008 |
| EP | 2160024 A2 | 3/2010 |
| GB | 2405718 A | 3/2005 |
| JP | 07-176351 | 7/1995 |
| JP | 10-321302 | 4/1998 |
| JP | 10-334993 | 12/1998 |
| JP | 11-288420 | 10/1999 |
| JP | 2000-214953 | 8/2000 |
| JP | 2000-223215 | 8/2000 |
| JP | 2000-223216 | 8/2000 |
| JP | 2000-223218 | 8/2000 |
| JP | 2001-035603 | 2/2001 |
| JP | 2001-069165 A | 3/2001 |
| JP | 2001-196133 | 7/2001 |
| JP | 2001-230021 | 8/2001 |
| JP | 2001-332350 | 11/2001 |
| JP | 2002-025720 | 1/2002 |
| JP | 2002-14304 A | 5/2002 |
| JP | 2002-203641 | 7/2002 |
| JP | 2002 245719 | 8/2002 |
| JP | 2002-252566 | 9/2002 |
| JP | 3090747 U | 10/2002 |
| JP | 2002-374447 | 12/2002 |
| JP | 2003-017165 | 1/2003 |
| JP | 2003-032351 | 1/2003 |
| JP | 2003-058430 A | 2/2003 |
| JP | 2003-274386 | 9/2003 |
| JP | 2002-342659 | 11/2003 |
| JP | 2004-078538 A | 3/2004 |
| JP | 2004-259280 A | 9/2004 |
| JP | 2008053955 A | 3/2008 |
| JP | 2008071419 A | 3/2008 |
| JP | 2009303001 A | 12/2009 |
| WO | WO 95/01058 A1 | 1/1995 |
| WO | WO 99/26330 | 5/1999 |
| WO | WO 9948089 A2 | 9/1999 |
| WO | WO 00/39907 | 7/2000 |
| WO | WO 00/60450 | 10/2000 |
| WO | WO 02/49314 | 6/2002 |
| WO | WO 03/036541 A1 | 5/2003 |
| WO | WO 03/036957 A1 | 5/2003 |
| WO | WO 03056776 A1 | 7/2003 |
| WO | WO 03/073688 | 9/2003 |
| WO | WO 2004/084413 | 9/2004 |
| WO | WO 2004-095772 A1 | 11/2004 |
| WO | WO 2004/112311 A | 12/2004 |
| WO | WO 2005/024818 A1 | 3/2005 |
| WO | WO 2005/119463 A | 12/2005 |
| WO | WO 2006/080957 A1 | 8/2006 |
| WO | WO 2008/080006 A2 | 7/2008 |

OTHER PUBLICATIONS

MAXTech Technology Ltd., CES 2000/Las Vegas, Jan. 6-9, 2000, [online], [retrieved on Sep. 23, 2008]. Retrieved from the Internet <URL: http://web.archive.org/web/20010223230441/www.maxtech.com.hk/g-p06.htm>. 2 pages.

Altec Lansing, "inMOTION Users Guide," Corp. Headquarters, 535 Rte.6 & 209, Milford, PA 18337.

Anonymous: "Future of Digital Music in Windows," Microsoft Windows Hardware Developer Central Archive, [Online] Dec. 4, 2001 URL:http://www.microsoft.com/whdc/archive/digitaudio.mspx> [retrieved on Jan. 15, 2008].

Anonymous: "Introduction to Digital Audio," Microsoft Windows Hardware Developer Central Archive, [Online] Dec. 4, 2001 URL:http://www.microsoft.com/whdc/archive/digitaudio.mspx> [retrieved on Jan. 15, 2008].

Anonymous; "Windows and Red Book Audio" Microsoft Windows Hardware Developer Central Archive, [Online] Dec. 4, 2001 URL:http://www.microsoft.com/whdc/archive/Dmfuture.mspx> [retrieved Jan. 15, 2008].

"A Serial Bus on Speed Diagram: Getting Connected with FireWire," downloaded Oct. 16, 2001, PC Magazine: PC Tech (A Serial Bus on Speed) wysiwyg://51http://www.zdnet.com/pctech/content/18/10/tu1810.007.html.

Belkin iPod Voice Recorder, Product Specification Sheet, printed Jun. 16, 2004.

Bindra, Ashok, "Standard Turns Monitor into I/O Hub," *Electronic Engineering Times*, vol. 918, Sep. 6, 1996, p. 14.

Brentrup, "Introduction to Public Key Cryptography Demystified," Campus Technology, printed from http://www.campus-technology.com/article.asp?id=7626 on Oct. 6, 2004.

Brown, "Making USB Work", downloaded Oct. 16, 2001, PC Magazine: PC Tech wysiwyq:/_15_5/http://www.zdnet.com/pcmag/pctech/content!18/04/tu1804.001.html.

"Cables to Go," download Oct. 16, 2001 http://www.cablestogo.com/product.asp?cat%5Fid=601&sku=27028.

Crawford et al., "Sample rate conversion and bit rate reduction in the studio," IEE Colloquim on Digital Audio Signal Processing, May 22, 1991, pp. 8-1.

Derman, Glenda, "Monitors Make Net Connections," *Electronic Engineering Times*, vol. 933, 1996, pp. 60 and 69.

"ExpressBus™ FUOI 0 User Guide Packing Checklist", Belkin Components.

"FireWire", downloaded Oct. 16, 2001, si wyg://42/http://developer.apple._com|hardware|Fire_Wire.

"Fire Wire Connector", downloaded Oct. 16, 2001, wysiwyg:/176/http://developer.apple.com/...es/Macintosh_CPUsG3/ibooks/ibooks-27.html.

Fried, "FireWire poised to become ubiquitous", downloaded Oct. 16, 2001, CNET News.com, 1394 Trade Association: Press, wysiwyg:/132/http:/_11394ta.org/Press/200_1_Press/august!8.2_7. b.html.

Fried, "New Fire Wire to blaze faster trail", downloaded Oct. 16, 2001, CNET News.com, http://news.cnet.com/news/0-I006-200-6021210.html.

"How to Connect Your Computer, PC Hardware", downloaded Oct. 16, 2001, http:///www.scar.utoronto.ca!~ccweb/faculty/connect-howto.html.

"IEEE 1394/USB Comparison", downloaded Oct. 16, 2001, www.genitech.com.au|LIBRARY/TechSupportiinfobits/firewirevsusb.htm.

"Introduction to Public Key Cryptography," Oct. 9, 1998, printed from http://developer.netscape.com/docs/manuals/security/pkin/contents.htm on Oct. 6, 2004.

iPod Classic User's Guide, acquired from apple.com, 2002; 44 pages.
iPod nano Features Guide, acquired from apple.com, 2008; 72 pages.
iPod touch User's Guide, acquired from apple.com, 2008, 120 pages.
"iPodDock/iPod Cradle," www.bookendzdocks.com/bookendz/dock_cradle.html, downloaded Feb. 27, 2003.

Lambert, "Digital Audio Interfaces," Journal of the Audio Engineering Society, Audio Engineering Society, New York, NY vol. 38, No. 9, (Sep. 1, 1990), pp. 681-684, 686, 68 XP000175146 ISSN: 1549-4950 figures 9, 10.

Lewis, Peter, "On Technology." *Fortune Magazine*, Dec. 9, 2002.

Menezes et al., "Handbook of Applied Cryptography," Identification and Entity Authentication, pp. 385-424.

Microsoft, "Media Transport Protocol Implementation Details," 2005, 18 pages.

"MPV™ Music Profile Specification Revision 1.00" Internet Citation [online] (Jan. 7, 2004) URL:http//www.osta.org/mpv/public/specs/MPVMusic-Prof-Spec-1.00.pdf> [retrieved Jun. 20, 2006] the whole document.

Networking Tech Note, "1394 Standards and Specifications," 3 pgs.

"Neuros MP3 Digital Audio Computer," www.neurosaudio.com, downloaded Apr. 9, 2003.

"PMC FW2 IEEE1394 FireWire Controller", downloaded Oct. 16, 2001, http://www.bvmltd.co.uk/PMCfw2ds.html.

Severance, "FireWire Finally Comes Home", Michigan State University, Standards, Nov. 1998, pp. 117-118.

Sinitsyn, Alexander, "Synchronization Framework For Personal Mobile Servers," *Pervasive Computing and Communications Workshops (PERCOMW'04)*, Proceedings of the Second IEEE Annual Conference, Piscataway, NJ, USA, IEEE, Mar. 14, 2004, pp. 208-212.

Teener, "Understanding Fire Wire: The IEEE 1394 Standards and Specifications", downloaded Oct. 16, 2001, wysiwyg:119/http:1|www.chipcenter.com/networking/ieee_1394/main.html.

"The Authoritative Dictionary of IEEE Standards Terms, Seventh Edition", Published by Standards Information Network, IEEE Press.

"Universal Serial Bus Specification—Rev 2.0," Chapter 6, Compaq Hewlett-Packard, Apr. 27, 2000, pp. 85, 99-100.

"Universal serial bus specification—rev 2.0," XP002474828, Chapter 9, USB Device Framework, pp. 239-274.

Vitaliano, "Why FireWire is Hot!Hot!Hot!", downloaded Oct. 16, 2001, "Impact.Fire Wire. SideBar" http://www.vxm.com/21R.35.html.

Whittle, "Public Key Authentication Framework: Tutorial," First Principles Consulting, Jun. 2, 1996.

"iPod Radio-Remote-Internals-1260.jpg;" Wikimedia Commons, The Free Media Repository; 4 pages; retrieved on Feb. 25, 2009; retrieved from the Internet http://commons.wikimedia.org/wiki/File:%E7%94%BB%E5%83%8F-IPod-radio-remote-internals-1260.jpg.

"iPod Radio Remote" 14 pages; 2007 Apple Inc.; China.

Macworld, Review: Apple iPod RadioRemote, Jan. 25, 2006, Retrieved on Jan. 10, 2009; Retrieved from the Internet <URL: http://www.macworld.com/article/49108/2006/01/ipodfrmremote.htlm>.

U.S. Appl. No. 12/610,966, filed Nov. 2, 2009, Laefer et al.

U.S. Appl. No. 12/553,380, filed Sep. 3, 2009, Bolton et al.

U.S. Appl. No. 12/372,689, filed Feb. 17, 2009, Yew, et al.

Partial International Search for Application No. PCT/US2009/059841 mailed on Nov. 3, 2010; 4 pages.

Detweiler, "Conversion Requirements For AM & FM IBOC Transmission," iBiquity Digital Corporation, [online], [retrieved Dec. 12, 2008]. Retrieved from the Internet <URL: http://www.ibiquity.com/i/pdfs/Conversion_Requirements.pdf> 7 pages.

Grabianowski, "How HD Radio Works," [online], [retrieved Dec. 8, 2008]. Retrieved from the Internet, <URL: http://electronics.howstuffworks.com/hd-radio.htm/printable> 5 pages.

Griffin Technology-radio SHARK, product information sheet, Griffin Technology, [online], [retrieved Jun. 18, 2006]. Retrieved from the Internet <URL: http://www.griffintechnology.com/products/radioshark> 2 pages.

HD Radio® iTunes Tagging for HD Radio™ Broadcasting (Download.PDF) [online], [retrieved on Apr. 14, 2009]. Retrieved from the Internet <URL: www.ibiquity.com/broadcaster/itunes®tagging/intro> 3 pages.

HD Radio, Wikipedia Encyclopedia [online], [retrieved on Jan. 17, 2009]. Retrieved from the Internet <URL: http://en.wikipedia.org/wiki/HD_Radio> 9 pages.

Ibiquity Digital, An Advanced Application Services Framework for Application and Service Developers using HD Radio™ Technology, Technical White Paper, Feb. 1, 2003, [online], [retrieved on Dec. 12, 2008]. Retrieved from the Internet <URL: www.hd-radio.com/i/pdfs/SY_TN_5032_000.pdf> 14 pages.

Ibiquity Digital Corporation, HD Radio™ Data Network Requirements, Application Note, Rev.09, Oct. 23, 2006, [online], [retrieved Dec. 12, 2008]. Retrieved from the Internet <URL: http://www.ibiquity.com/i/HD%20Networking%20Requirements%20v9(1).pdf 69 pages.

iBiquity Digital Corporation, IBOC DAB Field Test Platforms, by Grag A. Nease, [online], [retrieved on Dec. 12, 2008]. Retrieved from the Internet <URL: http://www.ibiquity.com/i/pdfs/Field_Test_Platforms.pdf> 14 pages.

Ibiquity Digital Corporation, iTunes® Tagging, Introductory Information for HD Radio Broadcasters, [online], [retrieved on Jan. 17, 2009]. Retrieved from the Internet <URL: http://www.ibiquity.com/broadcasters/tag> 3 pages.

iBiquity Digital, Emergency Alert System (EAS) Requirements for HD Radio™, Application Note Template, Rev.01, Nov. 28, 2006, [online], [retrieved Jan. 17, 2009]. Retrieved from the Internet <URL: www.hdradio.com/i/pdfs/EAS%20Paper_TX_TN_2089.pdf> 5 pages.

iBiquity Digital Corporation, HD Radio™ Networking Best Practices, MTM Technologies, prepared by Trieu Vu, Jul. 27, 2006, [online], [retrieved Dec. 12, 2008]. Retrieved from the Internet <URL: http://www.ibiquity.com/i/HD%20Networking%20Best%20Practices.pdf> 14 pages.

iBiquity Digital Corporation, HD Radio™ Networking Implementation Recommendations, MTM Technologies, prepared by Kurt VanderSluis, Jul. 27, 2006, [online], [retrieved Dec. 12, 2008]. Retrieved from the Internet <URL: http://www.ibiquity.com/i/HD%20Network%20Implementation%20Recommendations(1).pdf> 15 pages.

iBiquity Digital Corporation, The Structure and Generation of Robust Waveforms for AM in Band on Channel Digital Broadcasting, by Steve Johnson, [online], [retrieved on Dec. 12, 2008]. Retrieved from the Internet <URL: http://www.ibiquity.com/i/pdfs/Waveforms_AM.pdf> 10 pages.

iBiquity Digital Corporation, The Structure and Generation of Robust Waveforms for FM In-Band On-Channel Digital Broadcasting, by Paul J. Peyla, [online], [retrieved on Dec. 12, 2008]. Retrieved from the Internet <URL: http://www.ibiquity.com/i/pdfs/Waveforms_FM.pdf> 17 pages.

MacXM Features [online], [retrieved on Apr. 11, 2005]. Retrieved from the Internet <URL: http://macxm.sourceforge.net/features.html> 1 page.

MacXM Screenshots [online], [retrieved on Apr. 11, 2005]. Retrieved from the Internet <URL: http://macxm.sourceforge.net/shots.html> 2 pages.

MacXM FAQs [online], [retrieved on Apr. 11, 2005]. Retrieved from the Internet <URL: http://macxm.sourceforge.net/faq.html> 6 pages.

National Radio Systems Committee, "In-Band/On-Channel Digital Radio Broadcasting Standard NRSC-5," Apr. 2005, Consumer Electronics Association and National Association of Broadcasters, [online], retrieved on Jan. 17, 2009]. Retrieved from the Internet <URL: http://www.nrscstandards.org.> 46 pages.

Radio Data System, Radio Electronics.com [online], retrieved Dec. 12, 2008]. Retrieved from the Internet <URL: http://www.radio-electronics.com/info/broadcast/rds/rds.php> 4 pages.

Radio Data System, Wikipedia Encyclopedia [online], retrieved Dec. 12, 2008]. Retrieved from the Internet <URL: http://en.wikipedia.org/wiki/Radio_Data_System> 6 pages.

U.S. Appl. No. 12/553,850, filed Sep. 3, 2009, Bolton et al.

Chen et al., "Design and Implementation of a Hard Disk-Based Entertainment Device for Managing Media Contents on the go," Consumer Electronics, 1005. (ISCE 2005). Proceedings of the Ninth International Symposium on, pp. 328-333, Jun. 14-16, 2005.

LSI Logic's Broadcast PC Card Brings New Multimedia Capabilities to Personal Computing. (Nov. 16). PR Newswire, 1. Retrieved Jun. 26, 2010, from Business Dateline.

Slay et al., "iPod Forensics: Forensically Sound Examination of an Apple iPod," *System Sciences*, 2007. HICSS 2007. 40th Annual Hawaii International Conference on, pp. 1-9, Jan. 2007.

* cited by examiner

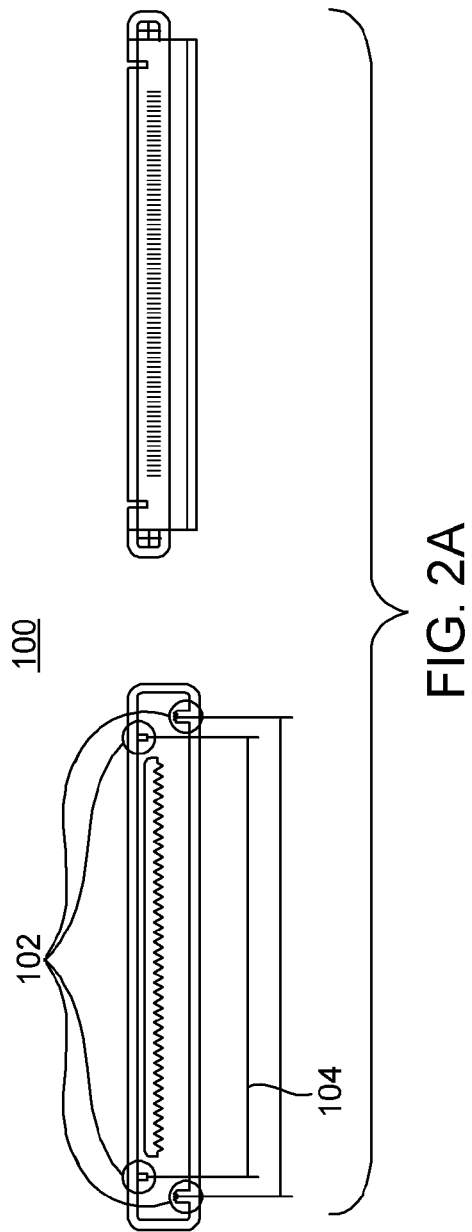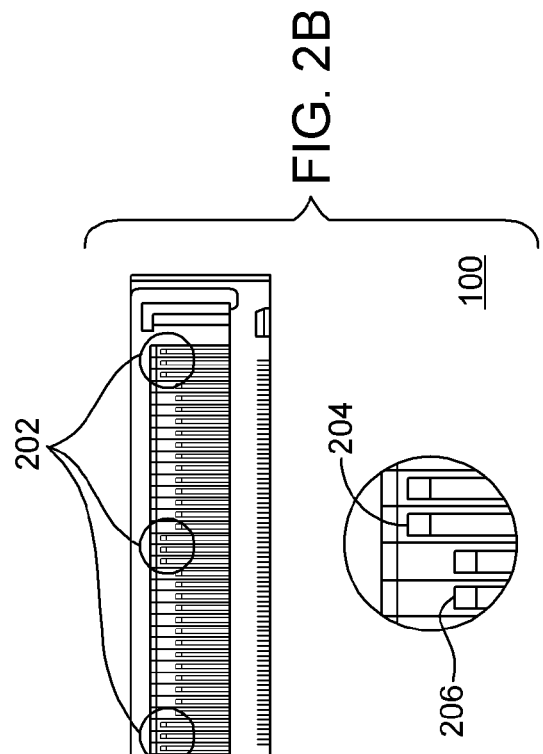

| Pin | Signal Name | I/O | Function |
|---|---|---|---|
| 1 | DGND | I | Digital Ground |
| 2 | DGND | I | Digital Ground |
| 3 | TPA+ | I/O | Firewire signal |
| 4 | USB D+ | I/O | USB signal |
| 5 | TPA- | I/O | Firewire signal |
| 6 | USB D- | I/O | USB signal |
| 7 | TPB+ | I/O | Firewire signal |
| 8 | USB PWR | I | USB power in. NOT for powering; only to detect USB host |
| 9 | TPB- | I/O | Firewire signal |
| 10 | Accessory Identify | I | Pull down in dock to notify iPod of specific device |
| 11 | F/W PWR+ | I | Firewire and charger input power (8V to 30V dc) |
| 12 | F/W PWR+ | I | Firewire and charger input power (8V to 30V dc) |
| 13 | Accessory Pwr(3V3) | O | 3.3V output from iPod. Current limited to 100mA. |
| 14 | Reserved | | |
| 15 | DGND | GND | Digital Ground in iPod |
| 16 | DGND | GND | Digital Ground in iPod |
| 17 | Reserved | | |
| 18 | Dock Tx | I | Serial protocol (Data to iPod) |
| 19 | Dock Rx | O | Serial protocol (Data from iPod) |
| 20 | Accessory Detect | I/O | |
| 21 | S Video Y | O | Luminance Component |

| 22 | S Video C | O | Chrominance Component |
|---|---|---|---|
| 23 | Video Composite | O | Composite Signal |
| 24 | Remote Sense | I | Detect Remote |
| 25 | LINE-IN L | I | Line level input to the iPod for the left channel |
| 26 | LINE-IN R | I | Line level input to the iPod for the right channel |
| 27 | LINE-OUT L | O | Line level output to the iPod for the left channel |
| 28 | LINE-OUT R | O | Line level output to the iPod for the right channel |
| 29 | Audio Return | GND | Audio return - Signal, never to be grounded inside accessory |
| 30 | DGND | GND | Digital Ground iPod |
| 31 | Chassis | | Chassis ground for connector shell |
| 32 | Chassis | | Chassis ground for connector shell |

FIG. 4A

| Pin | Signal Name | I/O | Function |
|---|---|---|---|
| 1 | Audio. Out Left / Mono Mic In | I/O | 30mW audio out left channel, also doubles as mono mic in |
| 2 | HP Detect | I | Internal Switch to detect plug insertion |
| 3 | Audio Return | GND | Audio return for left and right audio |
| 4 | Audio Out Right | O | 30mW audio out right channel |
| 5 | Composite Video | O | Video Signal |
| 6 | Accessory 3.3 V | O | 3.3V Accessory power 100mA max |
| 7 | Tx | O | Serial protocol (Data from iPod to Device) |
| 8 | Rx | I | Serial protocol (Data to iPod from Device) |
| 9 | D GND | GND | Digital ground for accessory |

FIG. 4B

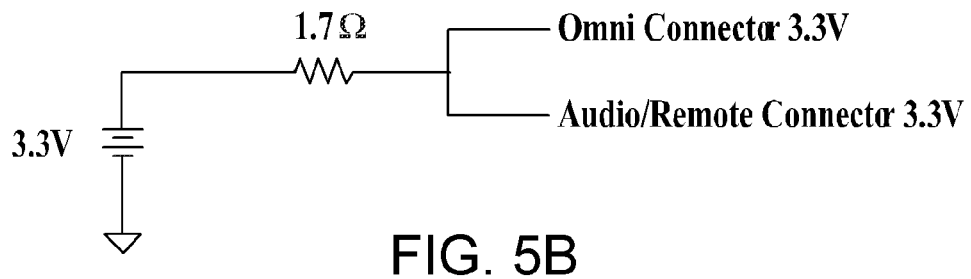

FIG. 5B

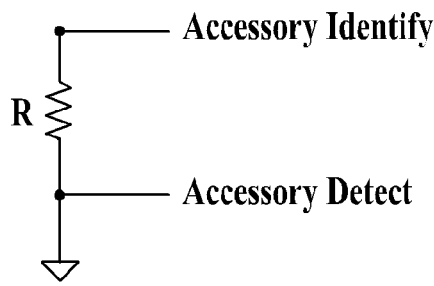

FIG. 5C

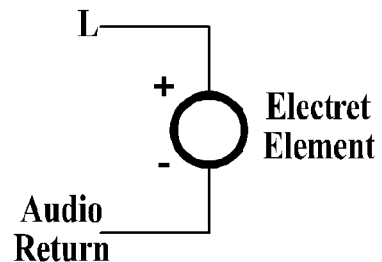

FIG. 5D

TECHNIQUES FOR TRANSFERRING DATA BETWEEN A MEDIA PLAYER AND AN ACCESSORY HAVING A TUNER

CROSS-REFERENCE TO RELATED APPLICATIONS

The present application claims priority from and is a continuation of U.S. patent application Ser. No. 11/519,386, filed Sep. 11, 2006, entitled "METHOD AND SYSTEM FOR CONTROLLING AN ACCESSORY HAVING A TUNER," the entire contents of which is incorporated herein by reference for all purposes.

The present application is related to the following commonly-assigned patent applications, the entire contents of which are incorporated herein by reference for all purposes:

U.S. patent application Ser. No. 11/519,278, entitled "Method and System for Controlling Power Provided to an Accessory", filed Sep. 11, 2006; and U.S. patent application Ser. No. 11/519,541, entitled "Method and System for Controlling Video Selection and Playback in a Portable Media Player", filed Sep. 11, 2006.

FIELD OF THE INVENTION

The present invention relates generally to electrical devices and more particularly to electrical devices such as portable media players that communicate with accessory devices.

BACKGROUND OF THE INVENTION

A portable media player stores media assets, such as audio tracks, video tracks or photos that can be played or displayed on the portable media player. One example of a portable media player is the iPod® portable media player, which is available from Apple Computer, Inc. of Cupertino, Calif. Often, a portable media player acquires its media assets from a host computer that serves to enable a user to manage media assets. As an example, the host computer can execute a media management application to manage media assets. One example of a media management application is iTunes®, version 6.0, produced by Apple Computer, Inc.

A portable media player typically includes one or more connectors or ports that can be used to interface to the portable media player. For example, the connector or port can enable the portable media player to couple to a host computer, be inserted into a docking system, or receive an accessory device. There are today many different types of accessory devices that can interconnect to the portable media player. For example, a remote control can be connected to the connector or port to allow the user to remotely control the portable media player. As another example, an automobile can include a connector and the portable media player can be inserted onto the connector such that an automobile media system can interact with the portable media player, thereby allowing the media content on the portable media player to be played within the automobile. In another example, a digital camera can be connected to the portable media player to download images and the like.

Numerous third-parties have developed accessories for use with portable media players. Some accessories that couple to portable media players include tuners. A tuner is an adjustable device that receives radio frequency broadcast signals (e.g., AM/FM signals) and converts them to sound and/or data. An accessory having a tuner typically couples to the portable media player via a connector or port. An accessory may be used with the portable media player as long as a compatible connector or port is utilized. It is important that the accessory and the portable media player communicate in an efficient and effective manner. The present invention addresses these issues.

SUMMARY OF THE INVENTION

A method, system, and connector interface for controlling an accessory are disclosed. The method includes obtaining, by a portable media player, tuning information from the accessory; and controlling, by the portable media player, the accessory based on the tuning information.

According to the system and method disclosed herein, the portable media player and accessory may utilize a plurality of commands utilized in a variety of environments such as within a connector interface system environment to control access to the portable media player.

BRIEF DESCRIPTION OF THE DRAWINGS

FIGS. 2A and 2B illustrate a docking connector in accordance with the present invention.

FIG. 4A illustrates the connector pin designations for the docking connector.

FIG. 4B illustrates the connection pin designations for the remote connector.

FIG. 5B illustrates a reference schematic diagram for an accessory power source.

FIG. 5C illustrates a reference schematic diagram for a system for detecting and identifying accessories for the docking connector.

FIG. 5D is a reference schematic of an electret microphone that may be within the remote connector.

DETAILED DESCRIPTION OF THE INVENTION

The present invention relates generally to electrical devices and more particularly to electrical devices such as portable media players that communicate with accessory devices. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A method and system in accordance with the present invention for controlling an accessory is disclosed. In one embodiment, the method includes obtaining tuning information from the accessory, where the accessory includes a tuner for receiving signals such as radio signals. In one embodiment, the tuning information includes capability information and state information, where the capability information may indicate what capabilities the accessory can perform, what features are present on the accessory, and the state information may indicate band information, frequency information, mode information, received signal strength indication (RSSI) information, etc. The method further includes controlling the accessory based on the tuning information by transmitting tuning information such as control information to the accessory to control the functionality of the accessory. The portable media player and accessory may utilize the plurality of commands utilized in a variety of environments to facilitate controlling access to the portable media player. To describe the features of the present invention in more detail refer now to the following discussion in conjunction with the accompanying figures.

Figure 1:
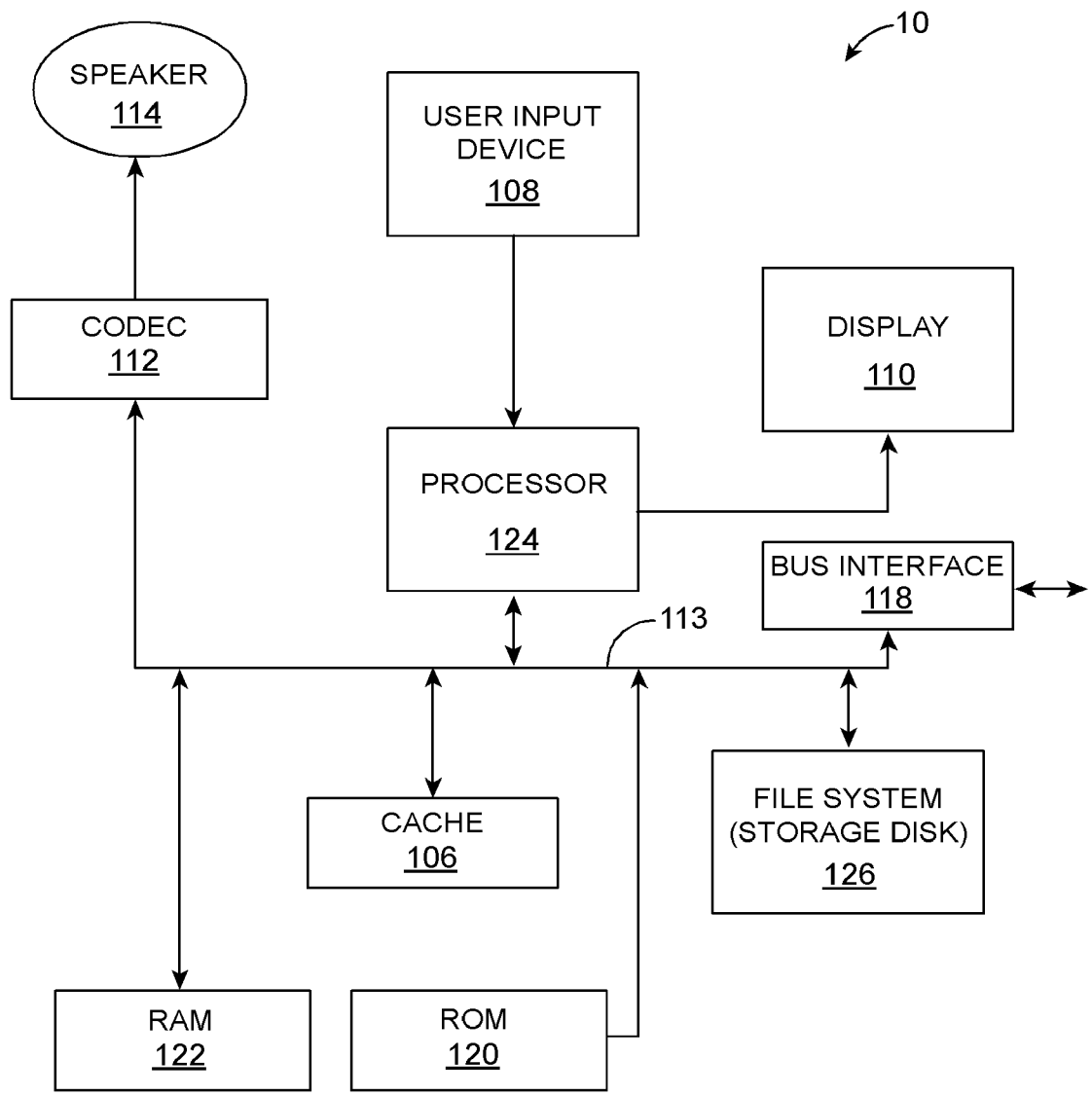
FIG. 1 shows an exemplary portable media player, in accordance with an embodiment of the invention.

FIG. 1 shows a simplified block diagram for an exemplary portable media player 10 in accordance with an embodiment of the invention. The portable media player 10 includes a processor 124 that pertains to a microprocessor or controller for controlling the overall operation of the portable media player 10. The portable media player 10 stores media data pertaining to media assets in a file system 126 and a cache 106. The file system 126 typically provides high capacity storage capability for the portable media player 10. However, to improve access time to the file system 126, the portable media player 10 can also include a cache 106. The cache 106 may be, for example, Random-Access memory (RAM). The relative access time to the cache 106 is substantially shorter than for the file system 126. However, the cache 106 typically does not have the large storage capacity of the file system 126. Further, the file system 126, when active, consumes more power than does the cache 106. The power consumption is particularly important when the portable media player 10 is powered by a battery (not shown). The portable media player 10 also includes additional RAM 122 and a Read-Only Memory (ROM) 120. The ROM 120 can store programs to be executed by the processor 124. The RAM 122 provides volatile data storage, such as for the cache 106.

The portable media player 10 also includes a user input device 108 that allows a user of the portable media player 10 to interact with the portable media player 10. For example, the user input device 108 can take a variety of forms, such as a button, keypad, touch screen, dial, etc. Still further, the portable media player 10 includes a display 110 (screen display) that can be controlled by the processor 124 to display information as well as photos and video tracks to the user. A data bus 113 can facilitate data transfer between at least the file system 126, the cache 106, the processor 124, and other functional blocks. The portable media player 10 also includes a bus interface 116 that couples to a data link 118. The data link 118 allows the portable media player 10 to couple to a host computer that can be a stand alone host computer or part of an interconnected network of computers, such as the Internet or other such distributed systems.

In one embodiment, the portable media player 10 serves to store a plurality of media assets (e.g., songs, videos, photos) in the file system 126. When a user desires to have the portable media player 10 play a particular media item, a list of available media assets is displayed on the display 110. Then, using the user input device 108, a user can select one of the available media assets. The processor 124, upon receiving a selection of a particular media item, such as an audio file, supplies the media data for the particular media item to a coder/decoder (CODEC) 112 via bus 113. The CODEC 112 then produces analog output signals for a speaker 114. The speaker 114 can be a speaker internal to the portable media player 10 or external to the portable media player 10. For example, headphones or earphones that connect to the portable media player 10 would be considered an external speaker. In other applications, media asset files stored on the host computer or in other computers coupled to the host computer by way of the network can be transferred (otherwise referred to as downloaded) to the file system 126 (or the cache 106). These media assets could also be, for example, videos or photos which could be provided to the display 110 via a video processor (not shown) either coupled to or within the processor 124. In this way, the user has available any number and type of media asset files for play by the portable media player 10.

For example, in a particular embodiment, the available media assets are arranged in a hierarchical manner based upon a selected number and type of groupings appropriate to the available media assets. In the case where the portable media player 10 is an MP3 type media player, the available media assets take the form of MP3 files (each of which corresponds to a digitally encoded song or other rendition) stored at least in part in the file system 126. The available media assets (or in this case, songs) can be grouped in any manner deemed appropriate. In one arrangement, the songs can be arranged hierarchically as a list of music genres at a first level, a list of artists associated with each genre at a second level, a list of albums for each artist listed in the second level at a third level, while at a fourth level a list of songs for each album listed in the third level, and so on.

A method and system in accordance with the present invention can be utilized with a portable media player and its associated accessory in a variety of environments. One such environment is within a connector interface system that is described in detail hereinbelow. The connector interface system allows for the portable media player and the accessory to communicate utilizing interface signals over at least one of the pins of the connector interface system.

Connector Interface System Overview

To describe the features of the connector interface system in accordance with the present invention in more detail, refer now to the following description in conjunction with the accompanying drawings.

Docking Connector

FIGS. 2A and 2B illustrate a docking connector 100 in accordance with the present invention. Referring first to FIG. 2A, the keying features 102 are of a custom length 104. In addition, a specific key arrangement where one set of keys are separated by one length are at the bottom and another set of keys are separated by another length at the top of the connector is used. The use of this key arrangement prevents noncompliant connectors from being plugged in and causing potential damage to the device. The connector for power utilizes a Firewire specification for power. The connector includes a first make/last break contact to implement this scheme. FIG. 2B illustrates the first make/last break contact 202 and also illustrates a ground pin 204 and a power pin 206 related to providing an appropriate first mate/last break contact. In this example, the ground pin 204 is longer than the power pin 206. Therefore, the ground pin 204 would contact its mating pin in the docking accessory before the power pin 206. Therefore the risk of internal electrical damage to the electronics of the device is minimized. Further details of an exemplary embodiment for the docking connector 100 are described in U.S. Pat. No. 6,776,660 entitled CONNECTOR, which issued on Aug. 17, 2004 and is incorporated herein by reference in it entirety.

In addition, a connector interface system in accordance with the present invention uses both USB and Firewire interfaces as part of the same docking connector alignment, thereby making the design more compatible with different types of interfaces, as will be discussed in detail hereinafter. In so doing, more remote accessories can interface with the portable media player.

Remote Connector

Figure 3A:
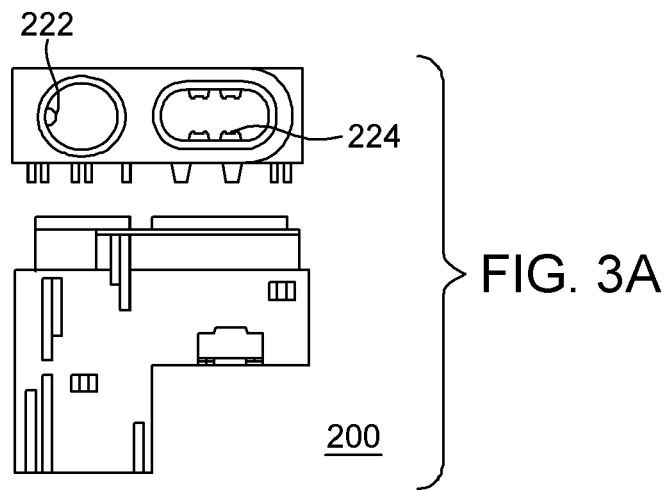
FIG. 3A is a front and top view of a remote connector in accordance with the present invention.
Figure 3B:
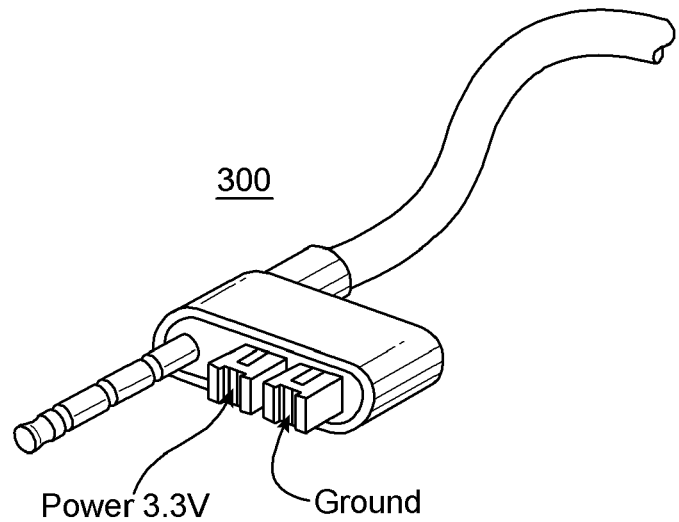
FIG. 3B illustrates a plug to be utilized in the remote connector.
Figure 3C:
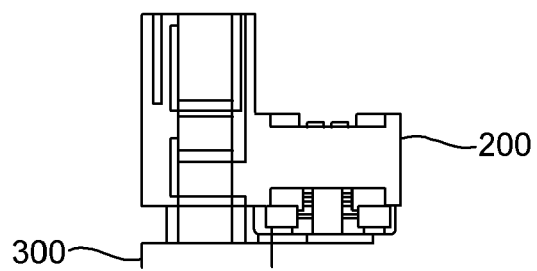
FIG. 3C illustrates the plug inserted into the remote connector.

The connector interface system also includes a remote connector which provides for the ability to output audio, input audio, provides I/O serial protocol, and the ability to input video and output video. FIG. 3A is a front and top view of a remote connector 200 in accordance with the present invention. As is seen, the remote connector 200 includes a top headphone receptacle 222, as well as a second receptacle 224 for remote devices. FIG. 3B illustrates a plug 300 to be utilized in the remote connector. The plug 300 allows these features to be provided via the remote connector. FIG. 3C illustrates the plug 300 inserted into the remote connector 200. Heretofore, all these features have not been implemented in a remote connector. Therefore, a standard headphone cable can be plugged in but also special remote control cables, microphone cables and video cables could be utilized with the remote connector.

To describe the features of the connector interface system in more detail, provided below is a functional description of the docking connector, remote connector and a command set in accordance with the present invention.

Docking and Remote Connector Specifications

For an example of the connector pin designations for both the docking connector and for the remote connector for a portable media player such as an iPod device by Apple Computer, Inc., refer now to FIGS. 4A and 4B. FIG. 4A illustrates the connector pin designations for the docking connector. FIG. 4B illustrates the connection pin designations for the remote connector.

Docking Connector Specifications

FIG. 4A illustrates a typical Firewire connector interface for the docking connector:

Firewire Power:
8V-30V DC IN
10 W Max
Firewire Signal:
Designed to IEEE 1394 A Spec (400 Mb/s)
USB Interface In one embodiment, the portable media player provides two configurations, or modes, of USB device operation: mass storage and portable media player USB Interface (MPUI). The MPUI allows the portable media player to be controlled using an accessory protocol. What is meant by an accessory protocol is the software component of the media player that communicates with accessories over a given transport layer.

Accessory Power

Figure 5A:
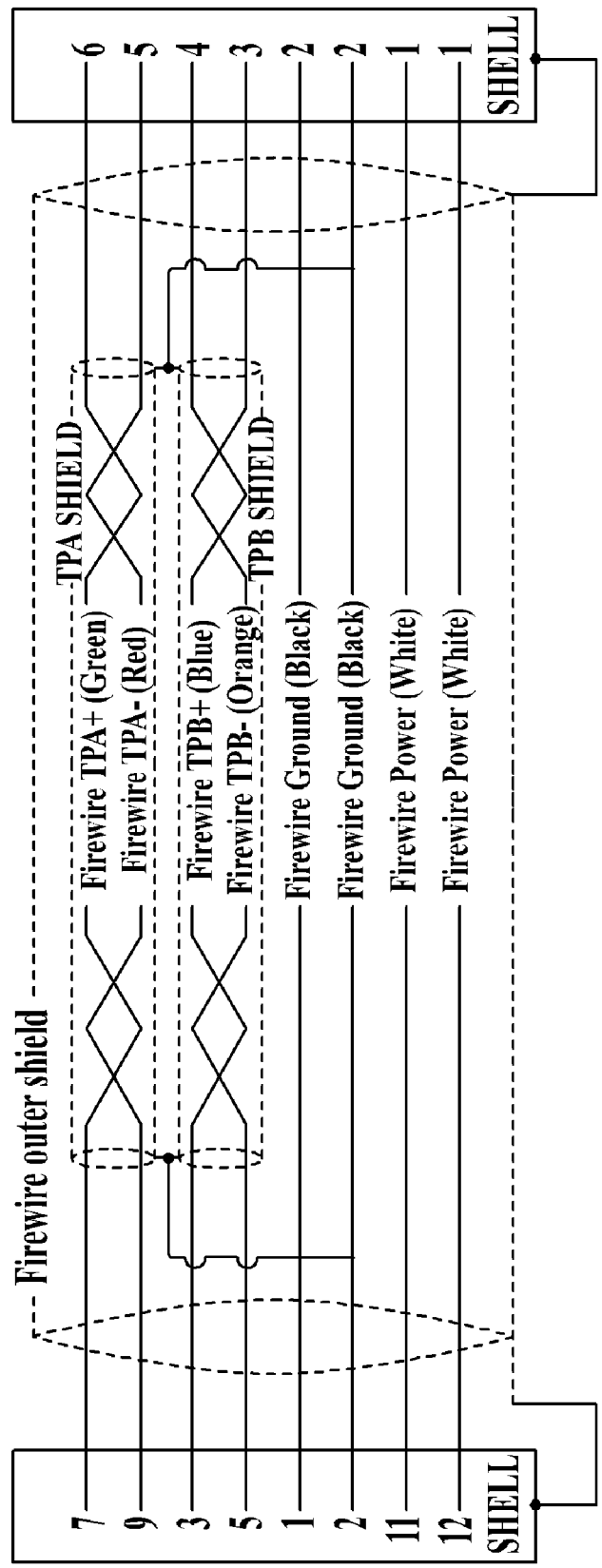
FIG. 5A illustrates a typical FireWire connector interface for the docking connector.

FIG. 5B illustrates the accessory power source. The portable media player accessory power pin supplies voltages, for example, 3.0 V to 3.3V+/−5% (2.85 V to 3.465 V) over the docking connector and remote connector (if present). A maximum current is shared between the docking connector and the remote connector.

By default, the portable media player supplies a particular current such as 5 mA. An appropriate software accessory detection system can be employed to turn on high power (for example, up to 100 mA) during active device usage. When devices are inactive, they typically consume less than a predetermined amount of power such as 5 mA current.

Accessory power is switched off for a period of, for example, approximately 2 seconds during the powering up of the portable media player. This is done to ensure that accessories are in a known state and can be properly detected. In one embodiment, accessories are responsible for re-identifying themselves after the portable media player transitions accessory power from the off to the on state.

Accessory power is grounded through the Digital Ground (DGND) pins.

FIG. 5C illustrates a reference schematic diagram for a system for detecting and identifying accessories for the docking connector. The system comprises:

A resistor (R) to ground allows the device to determine what type of accessory has been plugged into the docking connector.

Two identify and detect pins (Accessory Identify (pin 10, FIG. 4A) and Accessory Detect (pin 20, FIG. 4A)).

FIG. 5D is a reference schematic of an electret microphone that is within the remote connector.

Serial Protocol Communication:

Two pins used to communicate to and from device (Rx (pin 19, FIG. 4A) & Tx (pin 18, FIG. 4A)).

Input & Output (e.g., 0V=Low, 3.3V=High)

Figure 6:
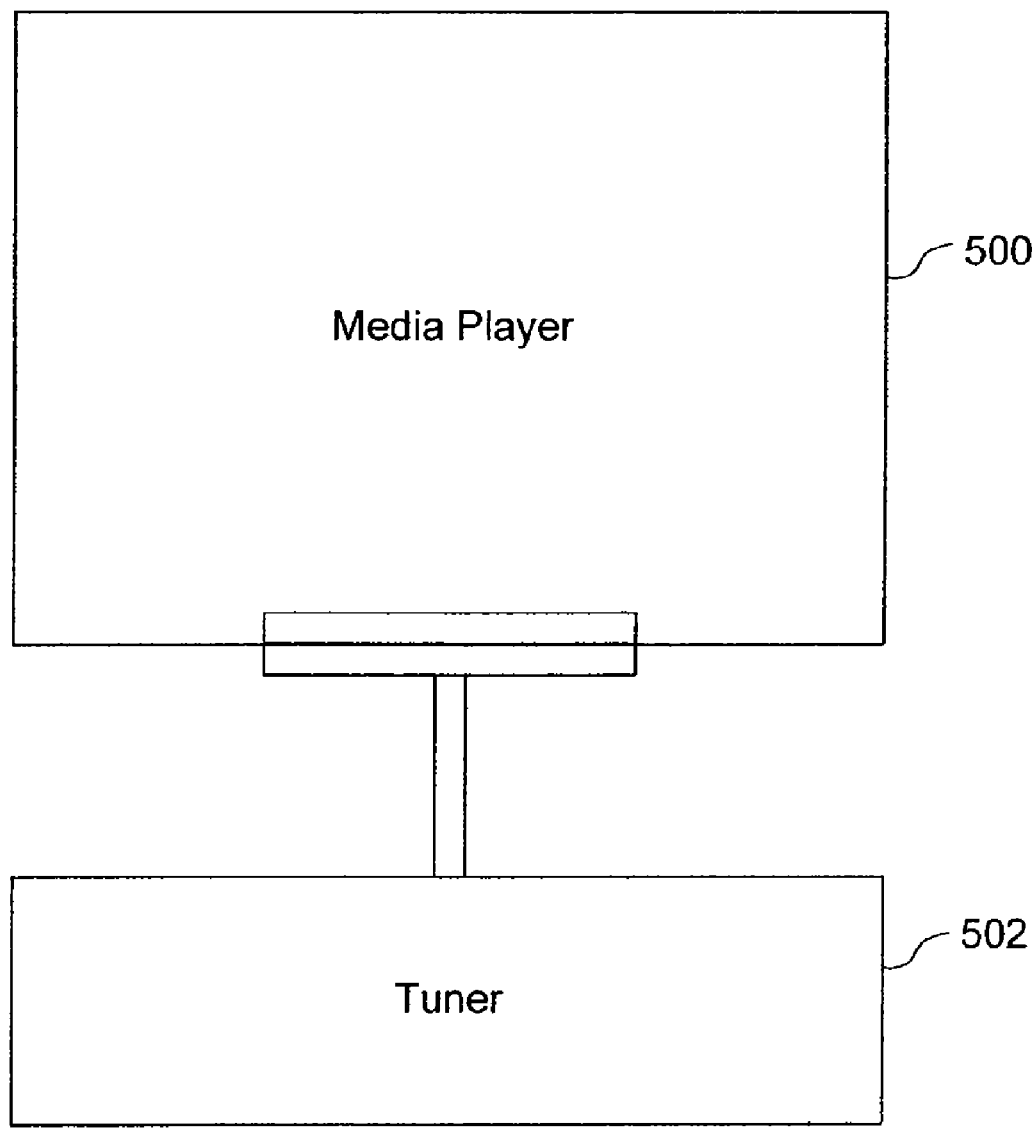
FIG. 6 illustrates a portable media player coupled to a tuner.

As mentioned previously, portable media players connect to a variety of accessories. FIG. 6 illustrate a portable media player 500 coupled to a tuner 502. Although FIG. 6 illustrates a portable media player 500 coupled directly to a tuner, the present invention may apply to any accessory that has a tuner, and still remain within the spirit and scope of the present invention.

As is seen, what is meant by accessories includes but is not limited to docking stations, chargers, car stereos, microphones, home stereos, computers, speakers, and accessories which communicate wirelessly with other accessories.

As mentioned previously, this connector interface system could be utilized with a command set for controlling an accessory having a tuner. In one embodiment, the accessory may be a host computer or any other electronic device or system that may communicate with the portable media player. It should be understood by one of ordinary skill in the art that although the above-identified connector interface system could be utilized with the command set, a variety of other connectors or systems could be utilized and they would be within the spirit and scope of the present invention.

Accessories with Tuners

For radio reception using a portable media player, accessories having a tuner may be attached to the portable media player. In one embodiment, when the portable media player detects an accessory, the portable media player may transition into a radio tuner mode where the portable media player can display, change, and/or control the settings, music source, RF band, tuner frequency, and Radio Data System/Radio Broadcast Data System (RDS/RBDS) data of the accessory. In one embodiment, RDS/RBDS data may include traffic information, song information (e.g., artist information, song name, radio station information, traffic alert information, etc.). The portable media player may display the RDS/RBDS data as well as other types of metadata on a screen. In one embodiment, an accessory may draw power from the portable media player or may supply power to the portable media player. In one embodiment, the portable media player may store stations and other state information. In one embodiment, the portable media player may notify the an accessory if a portable media player state changes such as transitioning to power on/light sleep/hibernate/deep sleep states.

Tuner Protocol

As described in more detail below, the portable media player and the accessory exchange commands. For example, utilizing the 30-pin connector in the interface between the portable media player and the accessory, the portable media player and the accessory would exchange commands over the serial protocol pins 18 and 19 (FIG. 4A). The portable media player and the accessory utilize the tuner protocol to exchange tuning information such as capability, state, and control information. In one embodiment, the tuner protocol enables the portable media player to function as a master device and enables the accessory to function as a slave device, responding to commands received from the portable media player. Accordingly, the portable media player may initiate actions such as controlling the power of the accessory, setting the tuner band/frequency, and initiating up/down frequency scans, etc.

When the portable media player sends a command to the accessory, the accessory responds with data when the command received from the portable media player requests data (e.g., capability or state information). In one embodiment, the accessory may respond with an acknowledgment command, which includes an acknowledgment and the requested data.

As described in more detail below, in one embodiment, the accessory transmits capability information to the portable media player. Based on the capability information received from the accessory, the tuner protocol may change the appearance of its display based on the presence/absence of certain tuner features. Generally, in one embodiment, if the portable media player sends a command to the accessory and the command involves a capability that the accessory does not support, the accessory may respond with an acknowledgement command indicating a failure (e.g., not supported).

In one embodiment, the tuner protocol may verify that the accessory has been instantiated, a tuner device associated with the accessory is actually present, and the tuner device has been authenticated successfully. In one embodiment, the tuner protocol parses the payload of commands, validates the received data, and sends a message to the appropriate application with the data received from the accessory. The tuner protocol applies appropriate time out operations as needed.

Although the present invention disclosed herein is described in the context of accessories having terrestrial tuners such as RF tuners, the present invention may apply to accessories having other types of tuners such as satellite tuners, and still remain within the spirit and scope of the present invention. Furthermore, in one embodiment, the tuner protocol may be used in conjunction with other protocols such as remote or display protocols. The following are example processes for controlling an accessory.

Figure 7:
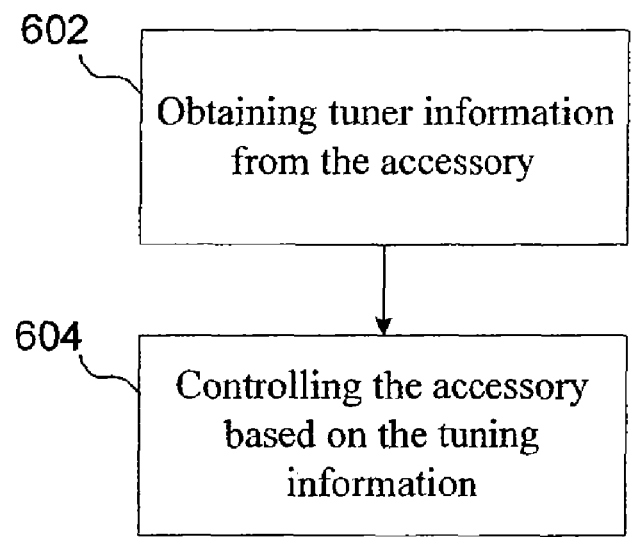
FIG. 7 is a flow chart, which illustrates a process for controlling an accessory.

FIG. 7 is a flow chart, which illustrates a process for controlling an accessory, in accordance with one embodiment of the present invention. As FIG. 7 illustrates, the process begins in step 602 where the portable media player obtains tuning information from the accessory, where the accessory includes a tuner for receiving signals such as radio signals. In one embodiment, the tuning information includes capability information and state information. As described in more detail below, the capability information may indicate what capabilities the accessory can perform. For example, the capability information may indicate that the accessory can perform radio frequency (RF) tuning functions, the tuner band or mode features of the accessory, etc. Also, the state information may indicate band information, frequency information, mode information, received signal strength indication (RSSI) information, etc. Next, in step 604, the portable media player controls the accessory based on the tuning information. More specifically, the portable media player transmits tuning information such as control information to the accessory to control the functionality of the accessory. More detailed embodiments of the capability, state, and control information, as well as their associated commands are described below in connection with FIG. 8.

Figure 8:
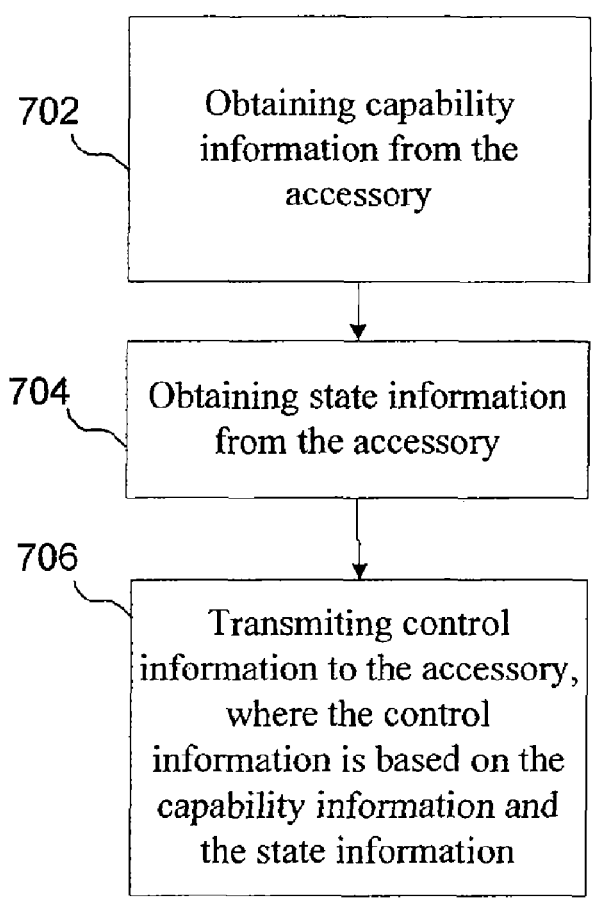
FIG. 8 is a flow chart, which illustrates another process for controlling an accessory.

FIG. 8 is a flow chart, which illustrates a process for controlling an accessory, in accordance with another embodiment of the present invention. As FIG. 8 illustrates, the process begins in step 702 where the portable media player obtains capability information from the accessory. More specifically, the portable media player transmits a command to the accessory requesting capability information. In response, the accessory transmits a command to the portable media player providing the capability information. As described in more detail below, the capability information may indicate, for example, band, resolution, mode, and control capabilities of the accessory.

Next, in step 704, the portable media player obtains state information from the accessory. More specifically, the portable media player transmits one or more commands to the accessory requesting the state information. In response, the accessory transmits one more commands to the portable media player providing the state information. As described in more detail below, the state information may include, for example, the current band, resolution, and mode of the accessory. In one embodiment, the portable media player may send commands to the accessory instructing the accessory to automatically send notifications to the portable media player indicating any state changes.

Next, in step 706, the portable media player transmits control information to the accessory, wherein the control information is based on the capability information and the state information. As described in more detail below, in one embodiment, the portable media player transmits one or more control commands to the accessory to set tuning functions and to control the accessory. In one embodiment, the control commands may be based at least in part on the capability information and the state information received from the accessory. Control commands may enable the portable media player to set band settings, set frequency settings, set mode settings, and/or control the operations of the accessory. As described in more detail below, the accessory may transmit an acknowledgment command including status information to the portable media player in response to commands received from the portable media player. For example, if the portable media player transmits a command to the accessory to set a frequency, the accessory may respond with an acknowledgement command including state information (e.g., the frequency to which the tuner of the accessory is tuned).

A method and system in accordance with the present invention for controlling an accessory has been disclosed. In one embodiment, the method includes obtaining tuning information from the accessory, where the tuning information may include capability information and state information. The method further includes controlling the accessory based on the tuning information by transmitting tuning information such as control information to the accessory to control the functionality of the accessory.

Although the present invention has been described in accordance with the embodiments shown, one of ordinary skill in the art will readily recognize that there could be variations to the embodiments and those variations would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Consequently, a computer-readable medium is intended to include a computer readable signal, which may be, for example, transmitted over a network.

Accordingly, many modifications may be made by one of ordinary skill in the art without departing from the spirit and scope of the appended claims.

What is claimed is:

1. A method performed by an accessory communicatively coupled with a portable media player, the method comprising:
   sending, to the portable media player, capability information indicating that the accessory is capable of performing one or more radio-frequency (RF) tuning functions;
   receiving, at a tuner included in the accessory, a plurality of RF signals, wherein the tuner is a terrestrial tuner or a satellite tuner;
   converting, via the tuner, the plurality of RF signals into audio data; and
   sending the audio data to the portable media player.

2. The method of claim 1 further comprising:
   receiving, from the portable media player, a request for state information indicating a current state of the tuner; and
   sending the state information to the portable media player.

3. The method of claim 1, wherein the accessory is powered by the portable media player.

4. The method of claim 1, wherein the one or more RF tuning functions include one or more of: a band function, resolution function, mode function, or control function.

5. The method of claim 1, wherein the portable media player is configured to verify that the accessory has been instantiated and authenticated to interoperate with the portable media player prior to receiving the capability information.

6. The method of claim 2, wherein the state information includes one or more of: current band information, current frequency information, current mode information, or current received signal strength (RSSI) information.

7. The method of claim 2, wherein the portable media player is configured to present the state information on a display of the portable media player.

8. The method of claim 3 further comprising:
   receiving notification from the portable media player when the portable media player transitions between power states.

9. The method of claim 8, wherein the power states include a power on state and a sleep state.

10. An accessory for use with a portable media player, the accessory comprising:
    a radio-frequency (RF) tuner, the tuner being a terrestrial tuner or a satellite tuner;
    an interface adapted to be coupled with a portable media player; and
    a control module coupled to the interface, the control module being configured to:
       send, to the portable media player, capability information indicating that the accessory is capable of performing one or more RF tuning functions;
       receive, at the tuner, a plurality of RF signals;
       convert, via the tuner, the plurality of radio signals into audio data; and
       send the audio data to the portable media player via the interface.

11. The accessory of claim 10, wherein the control module is further configured to:
    receive, from the portable media player, a request for state information indicating a current state of the tuner; and
    send the state information to the portable media player.

12. The accessory of claim 10, wherein the accessory is powered by the portable media player.

13. The accessory of claim 10, wherein the one or more RF tuning functions include one or more of: a band function, resolution function, mode function, or control function.

14. The accessory of claim 10, wherein the portable media player is configured to verify that the accessory has been instantiated and authenticated to interoperate with the portable media player prior to receiving the capability information.

15. The accessory of claim 11, wherein the state information includes one or more of: current band information, current frequency information, current mode information, or current received signal strength (RSSI) information.

16. The accessory of claim 11, wherein the portable media player is configured to present the state information on a display of the portable media player.

17. The accessory of claim 12, wherein the control module is further configured to:
    receive notification from the portable media player when the portable media player transitions between power states.

18. The accessory of claim 17, wherein the power states include a power on state and a sleep state.

19. The accessory of claim 10, wherein the interface comprises a connector having a plurality of signal pins, the signal pins being arranged to mate with corresponding signal pins on a mating connector of the portable media player.

20. The accessory of claim 19, wherein the plurality of signal pins includes a pair of serial pins and wherein the audio data is sent via a transmit pin of the pair of serial pins.

21. The accessory of claim 20, wherein the plurality of signal pins further includes:
    a ground pin and a power pin adapted such that the ground pin makes contact with a corresponding ground pin in the mating connector of the portable media player before the power pin makes contact with a corresponding power pin in the mating connector of the portable media player;
    a USB signal pin;
    a USB power pin;
    an accessory identify signal pin;
    an accessory detect signal pin;
    a video output pin;
    an accessory power pin; and
    a line signal pin.

22. The accessory of claim 19, wherein the connector comprises a keying arrangement, and wherein one set of keys are separated by one length and another set of keys are separated by another length.

23. A method performed by a portable media player communicatively coupled with an accessory, the method comprising:
    receiving, from the accessory, capability information indicating that the accessory is capable of performing one or more radio-frequency (RF) tuning functions; and
    receiving audio data from the accessory, wherein the audio data is generated by a tuner included in the accessory from a plurality of RF signals received by the tuner, and wherein the tuner is a terrestrial tuner or a satellite tuner.

24. The method of claim 23 further comprising:
    sending, to the accessory, a request for state information indicating a current state of the tuner; and
    receiving the state information from the accessory.

25. The method of claim 23, wherein the one or more RF tuning functions include a band function, resolution function, mode function, and control function.

26. The method of claim 23 further comprising:
verifying that the accessory has been instantiated and authenticated to interoperate with the portable media player prior to receiving the capability information.

27. The method of claim 24, wherein the state information includes one or more of: current band information, current frequency information, current mode information, or current received signal strength (RSSI) information.

28. The method of claim 24 further comprising:
presenting the state information on a display of the portable media player.

29. The method of claim 23, wherein the portable media player powers the accessory.

30. The method of claim 29 further comprising:
sending notification to the accessory when the portable media player transitions between power states.

31. The method of claim 30, wherein the power states include a power on state and a sleep state.

32. A portable media player comprising:
a storage device configured to store a plurality of media assets;
an interface adapted to be coupled with an accessory; and
a control module coupled to the storage device and the interface, the control module being configured to:
receive, from the accessory, capability information indicating that the accessory is capable of performing one or more radio-frequency (RF) tuning functions; and
receive audio data from the accessory, wherein the audio data is generated by a tuner included in the accessory from a plurality of RF signals received by the tuner, and wherein the tuner is a terrestrial tuner or a satellite tuner.

33. The portable media player of claim 32, wherein the control module is further configured to:
send, to the accessory, a request for state information indicating a current state of the tuner; and
receive the state information from the accessory.

34. The portable media player of claim 32, wherein the portable media player powers the accessory.

35. The portable media player of claim 32, wherein the one or more RF tuning functions include a band function, resolution function, mode function, and control function.

36. The portable media player of claim 32, wherein the control module is further configured to:
verify that the accessory has been instantiated and authenticated to interoperate with the portable media player prior to receiving the capability information.

37. The portable media player of claim 33, wherein the state information includes one or more of: current band information, current frequency information, current mode information, or current received signal strength (RSSI) information.

38. The portable media player of claim 33, wherein the control module is further configured to:
present the state information on a display of the portable media player.

39. The portable media player of claim 34, wherein the control module is further configured to:
send notification to the accessory when the portable media player transitions between power states.

40. The portable media player of claim 39, wherein the power states include a power on state and a sleep state.

41. The portable media player of claim 32, wherein the interface comprises a connector having a plurality of signal pins, the signal pins being arranged to mate with corresponding signal pins on a mating connector of the accessory.

42. The portable media player of claim 41, wherein the plurality of signal pins includes:
a ground pin and a power pin adapted such that the ground pin makes contact with a corresponding ground pin in the mating connector of the accessory before the power pin makes contact with a corresponding power pin in the mating connector of the accessory;
a USB signal pin;
a USB power pin;
an accessory identify signal pin;
an accessory detect signal pin;
a video output pin;
an accessory power pin; and
a line signal pin.

43. The portable media player of claim 41, wherein the connector comprises a keying arrangement, and wherein one set of keys are separated by one length and another set of keys are separated by another length.

* * * * *

UNITED STATES PATENT AND TRADEMARK OFFICE
CERTIFICATE OF CORRECTION

PATENT NO. : 7,949,810 B2
APPLICATION NO. : 12/208987
DATED : May 24, 2011
INVENTOR(S) : Lawrence G. Bolton et al.

It is certified that error appears in the above-identified patent and that said Letters Patent is hereby corrected as shown below:

On Title page 4, item (56): under "Other Publications", in column 2, line 14, delete "httml." and insert -- html. --, therefor.

On Title page 4, item (56): under "Other Publications", in column 2, line 28, delete "Colloquim" and insert -- Colloquium --, therefor.

On Title page 4, item (56): under "Other Publications", in column 2, line 51, delete "Crypotography,"" and insert -- Cryptography," --, therefor.

On Sheet 9 of 9, Reference Numeral 706, Figure 8, line 1, delete "Transmiting" and insert -- Transmitting --, therefor.

In column 4, line 65, delete "it" and insert -- its --, therefor.

In column 6, line 19, after "High)" insert -- . --.

Signed and Sealed this
Sixth Day of December, 2011

David J. Kappos
*Director of the United States Patent and Trademark Office*